US010433378B1

(12) United States Patent
Del Croce et al.

(10) Patent No.: US 10,433,378 B1
(45) Date of Patent: Oct. 1, 2019

(54) POWER CONVERTER CONTROL USING CALCULATED AVERAGE CURRENT

(71) Applicant: Infineon Technologies AG, Neubiberg (DE)

(72) Inventors: Paolo Del Croce, Villach (AT); Albino Pidutti, Villach (AT); Andrea Baschirotto, Tortona (IT); Osvaldo Gasparri, Santa Maria Hoè (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/248,614

(22) Filed: Jan. 15, 2019

(51) Int. Cl.
*H05B 33/08* (2006.01)
*H02M 1/08* (2006.01)
*H02M 3/156* (2006.01)
*H02M 1/00* (2006.01)

(52) U.S. Cl.
CPC .......... *H05B 33/0815* (2013.01); *H02M 1/08* (2013.01); *H02M 3/156* (2013.01); *H02M 2001/0009* (2013.01)

(58) Field of Classification Search
CPC .... H05B 33/0815; H02M 3/156; H02M 1/08; H02M 2001/0009
See application file for complete search history.

(56) References Cited

U.S. PATENT DOCUMENTS

2013/0162165 A1\* 6/2013 Saes ................... H05B 33/0815
315/224

\* cited by examiner

*Primary Examiner* — Douglas W Owens
*Assistant Examiner* — Jianzi Chen
(74) *Attorney, Agent, or Firm* — Shumaker & Sieffert, P.A.

(57) ABSTRACT

A controller circuit is configured to drive a switching element to establish a channel that electrically couples a source to an inductive element of a buck converter and generate a minimum current sample. In response to current at the switching element exceeding a target peak current threshold of a set of control parameters for the buck converter, the controller circuit is configured to generate a peak current sample, calculate a mean current using the minimum current sample and the peak current sample, and modify the set of control parameters using the mean current. In response to the switching element satisfying an off time of the set of control parameters, the controller circuit is configured to drive the switching element to establish the channel that electrically couples the source to the inductive element during an on state for a subsequent switching period.

20 Claims, 6 Drawing Sheets

POWER CONVERTER CONTROL USING CALCULATED AVERAGE CURRENT

TECHNICAL FIELD

This disclosure relates electrical power converters, and in particular, to buck converters.

BACKGROUND

DC/DC converters, including buck converters, may be used as drivers for loads with specific current and/or voltage requirements, such as chains of one or more light-emitting diodes (LEDs). The light intensity of an LED chain is controlled by the amount of current flowing through the LED chain. Generally, a closed loop current generator may be used to keep the current constant. For lighting with a high current load, switched-mode controllers may be used. In some applications, such as in automotive lighting applications, a buck DC/DC converter topology may be used.

SUMMARY

In general, this disclosure is directed to controlling an average current flowing through a set of light-emitting diodes (LEDs). For example, a controller circuit for a buck converter may calculate a mean current using a minimum current sample and a peak current sample. In this example, the controller circuit may drive the buck converter to supply an average current to the set of LEDs without directly measuring current at the set of LEDs. In this way, the controller circuit may omit a pin dedicated for measuring current at the set of LEDs, which may reduce a cost of a resulting circuit.

In one example, a controller circuit for a buck converter is configured to: drive a switching element to establish a channel that electrically couples a source to an inductive element of the buck converter during an on state for a current switching period; in response to driving the switching element to establish the channel, generate a minimum current sample corresponding to measured current at the switching element; in response to current at the switching element exceeding a target peak current threshold of a set of control parameters for the buck converter: drive the switching element to refrain from establishing the channel that electrically couples the source to the inductive element during an off state for the current switching period; generate a peak current sample corresponding to measured current at the switching element; calculate a mean current using the minimum current sample and the peak current sample; and modify the set of control parameters for the buck converter using the mean current; and in response to the switching element satisfying an off time of the set of control parameters during the off state for the current switching period, drive the switching element to establish the channel that electrically couples the source to the inductive element during an on state for a subsequent switching period.

In another example, a method for controlling a buck converter comprises: driving, by controller circuitry, a switching element to establish a channel that electrically couples a source to an inductive element of the buck converter during an on state for a current switching period; in response to driving the switching element to establish the channel, generating, by the controller circuitry, a minimum current sample corresponding to measured current at the switching element; in response to current at the switching element exceeding a target peak current threshold of a set of control parameters for the buck converter: driving, by the controller circuitry, the switching element to refrain from establishing the channel that electrically couples the source to the inductive element during an off state for the current switching period; generating, by the controller circuitry, a peak current sample corresponding to measured current at the switching element; calculating, by the controller circuitry, a mean current using the minimum current sample and the peak current sample; and modifying, by the controller circuitry, the set of control parameters for the buck converter using the mean current; and in response to the switching element satisfying an off time of the set of control parameters during the off state for the current switching period, driving, by the controller circuitry, the switching element to establish the channel that electrically couples the source to the inductive element during an on state for a subsequent switching period.

In another example, a buck converter system comprises: a battery; a set of LEDs; a buck converter comprising an inductive element; a controller circuit configured to: drive a switching element to establish a channel that electrically couples the battery to the inductive element during an on state for a current switching period; in response to driving the switching element to establish the channel, generate a minimum current sample corresponding to measured current at the switching element; in response to current at the switching element exceeding a target peak current threshold of a set of control parameters for the buck converter: drive the switching element to refrain from establishing the channel that electrically couples the battery to the inductive element during an off state for the current switching period; generate a peak current sample corresponding to measured current at the switching element; calculate a mean current using the minimum current sample and the peak current sample; and modify the set of control parameters for the buck converter using the mean current; and in response to the switching element satisfying an off time of the set of control parameters during the off state for the current switching period, drive the switching element to establish the channel that electrically couples the battery to the inductive element during an on state for a subsequent switching period.

Details of these and other examples are set forth in the accompanying drawings and the description below. Other features, objects, and advantages will be apparent from the description and drawings, and from the claims.

DETAILED DESCRIPTION

In some examples, light-emitting diode (LED) applications may use a set of LEDs that have a combined operating voltage that is less than a supply voltage. Such LED applications may be useful in automobile lighting or other settings. Automobile lighting, for example, may include lighting of instruments or controls, as well as automotive front-lighting (e.g., high beam lighting, low beam lighting, directional lighting, lighting based on object detection, or other lighting techniques). For example, an application may use a single high-brightness LED having an operating voltage of less than a minimum supply voltage from a battery. In such applications, a buck direct current (DC)-DC converter may be used as an LED driver. For example, there may be no need to boost a voltage because the set of LEDs may operate with supply voltage of less than 4 volts while a battery supply may provide a voltage of more than 6 volts. In other examples, the supply voltage and/or the LED operating voltage may be different.

In some systems, a controller circuit for buck converter control may apply a controlled time off ("Toff") topology to control an average current output to the set of LEDs. In such systems, the controller circuit may continuously measure a current at the set of LEDs using a sensing resistor in series to the set of LEDs or placed between a diode of the buck converter circuit and an inductor of the buck converter circuit. In such systems, the resistor may be external to the chip (e.g., integrated circuit (IC)) implementing the controller circuit. As such, a Rsense pin is included on the IC and corresponding printed circuit board (PCB), with at least an extra pad and metal line for reading the voltage drop across the Rsense pin.

Rather than relying on a sensing resistor external to an IC implementing the controller circuit, a controller circuit may use an internal reading (e.g., on-chip) of the current. In this way, an Rsense pin may be omitted on the IC and a corresponding PCB may omit the extra pad and metal line, which reduces space on the PCB and cost of the IC, PCB, and resulting controller circuit.

Moreover, rather than using continuously sampled current values at an external sensing resistor, the controller circuit may be configured to use two or more current samples for calculating the average load current at the set of LEDs. For example, the controller circuit may generate (e.g., sample using an analog-to-digital converter (ADC), store at a capacitor, etc.) a first current sample during an on-switch phase when a minimum current at an inductor of the buck converter is reached. In this example, the controller circuit may generate a second current sample when a peak current value at the inductor of the buck converter is reached. The controller circuit may calculate (e.g., extrapolate) the average current at the set of LEDs using the two or more samples.

The controller circuit may control the buck converter such that the average current at the set of LEDs corresponds (e.g., equals, is proportional, etc.) to a target mean current for the set of LEDs. For example, the controller circuit may dynamically modify a time off value used to determine when to start an on-switch phase of the buck converter such that a difference between the average current and the target mean current is minimized. In some examples, the controller circuit may dynamically modify a target peak current threshold used to determine when to start an off-switch phase of the buck converter such that a difference between the average current and the target mean current is minimized.

A controller circuit configured to use an internal reading of current may integrate more components on chip (e.g., within a single IC), which may reduce costs compared to controller circuits using an external sensing resistor. Moreover, systems using an internal reading may sense current between a high-side switching element (e.g., DMOS) and diode such that current will be read only during an on phase of the high-side switching element, which may reduce a power consumption compared to systems that read current during both an on phase and an off phase of the high-side switching element.

Figure 1:
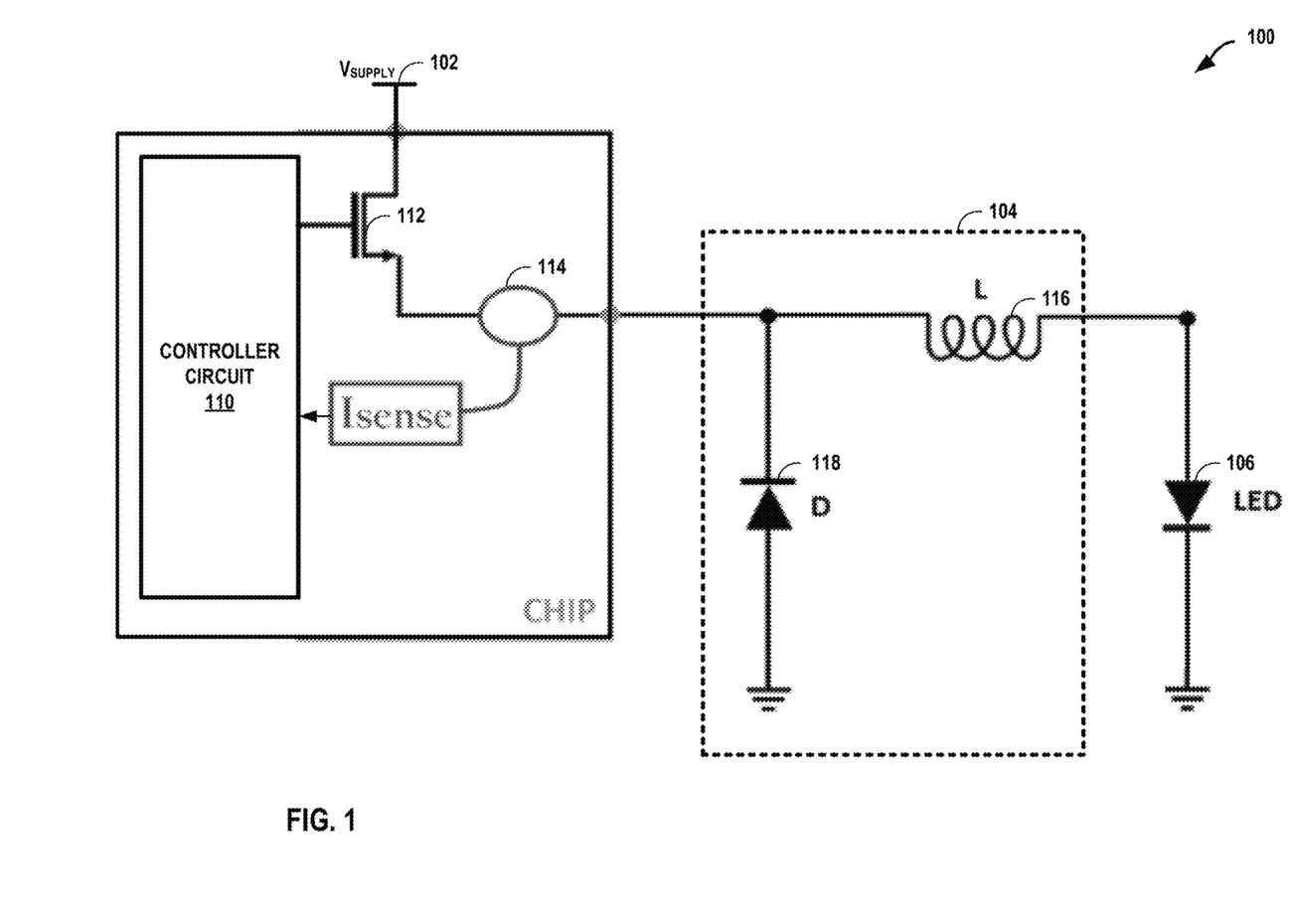
FIG. 1 is a block diagram illustrating an example system configured for power converter control using a calculated average current, in accordance with one or more techniques of this disclosure.

FIG. 1 is a block diagram illustrating an example system 100 configured for power converter control using a calculated average current, in accordance with one or more techniques of this disclosure. As illustrated in the example of FIG. 1, system 100 may include supply 102, buck converter 104, a set of LEDs 106 (hereinafter "LEDs"), controller circuit 110, switching element 112, and current sensor 114. As shown, buck converter 104 includes inductive element 116 and diode 118. In some examples, diode 118 may instead include a switching element configured for active rectification. As shown, in the buck converter scheme, an output capacitor may be omitted for driving a LED in current mode.

Supply 102 may be configured to provide electrical power to one or more other components of system 100. For instance, supply 102 may be configured to supply power to LEDs 106. In some examples, supply 102 includes a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 102 may include an output of a linear voltage regulator, a power converter, or a power inverter. For instance, supply 102 may include an output of a DC to DC power converter, an alternating current (AC) to DC power converter, and the like. In some examples, supply 102 may represent a connection to an electrical supply grid. In some examples, the input power signal provided by supply 102 may be a DC input power signal. For instance, in some examples, supply 102 may be configured to provide a DC input power signal in the range of ~5 $V_{DC}$ to ~40 $V_{DC}$. In some examples, supply 102 may output a voltage of between 6 volts and 16 volts.

LEDs 106 may refer to any suitable semiconductor light source. In some examples, LEDs 106 include a p-n junction configured to emit light when activated. In an exemplary application, LEDs 106 be included in a headlight assembly for automotive applications. For instance, LEDs 106 may be a matrix of light emitting diodes to light a road ahead of a vehicle. As used herein, a vehicle may refer to trucks, boats, golf carts, snowmobiles, heavy machines, or any type of vehicle that uses directional lighting. In some examples, LEDs 106 may include one or two LEDs.

Current sensor 114 may include an internal resistor that generates a voltage corresponding to a current flowing through the internal resistor. In some examples, current sensor 114 may include a hall effect sensor, current clamp meter, or another current sensor.

Switching element 112 may be configured to establish a channel that electrically couples supply 102 to inductive element 116. Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. Examples of BJTs may include, but are not limited to, PNP, NPN, heterojunction, or any other type of BJT, or any combination of the same. Switching elements may be high-side or low-side switching elements. Additionally, switching elements may be voltage-controlled and/or current-controlled. Examples of current-controlled switching elements may include, but are not limited to, gallium nitride (GaN) MOSFETs, BJTs, or other current-controlled elements.

Controller circuit 110 may be configured to control switching element 112 such that an average current at LEDs 106 corresponds (e.g., equals, is proportional, etc.) to a target mean current. In some examples, controller circuit 110 may switch switching element 112 such that buck converter 104 outputs a voltage of between 3 volts and 4 volts to LEDs 106.

Controller circuit 110 may comprise a microcontroller on a single integrated circuit containing a processor core, memory, inputs, and outputs. For example, controller circuit 110 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller circuit 110 may be a combination of one or more analog components and one or more digital components.

In the example of FIG. 1, supply 102 comprises a positive node and a reference node (e.g., earth ground, a local ground rail, or another reference node). In this example, current sensor 114 is arranged in an integrated circuit with switching element 112 and current sensor 114 is configured to output an indication of measured current at switching element 112. As shown, switching element 112 comprises a control node coupled to controller circuit 110, a first node coupled to the positive node of supply 102, and a second node. In this example, buck converter 104 comprises diode 118 having an anode coupled to the reference node of supply 102 and a cathode coupled to the second node of switching element 112. As shown, inductive element 116 comprises a first node coupled to the second node of switching element 112 and a second node coupled to LEDs 106.

In accordance with one or more techniques described, controller circuit 110 may be configured to drive switching element 112 to establish a channel that electrically couples supply 102 to inductive element 116 of buck converter 104 during an on state for a current switching period. In response to driving switching element 112 to establish the channel, controller circuit 110 may be configured to generate a minimum current sample corresponding to measured current at switching element 112. In response to measured current at switching element 112 exceeding a target peak current threshold of a set of control parameters for buck converter 104, controller circuit 110 may be configured to drive switching element 112 to refrain from establishing the channel that electrically couples supply 102 to inductive element 116 during an off state for the current switching period, generate a peak current sample corresponding to measured current at switching element 112, calculate a mean current using the minimum current sample and the peak current sample, and modify the set of control parameters for buck converter 104 using the mean current. In response to switching element 112 satisfying an off time of the set of control parameters during the off state for the current switching period, controller circuit 110 may be configured to drive switching element 112 to establish the channel that electrically couples supply 102 to inductive element 116 during an on state for a subsequent switching period.

Figure 2:
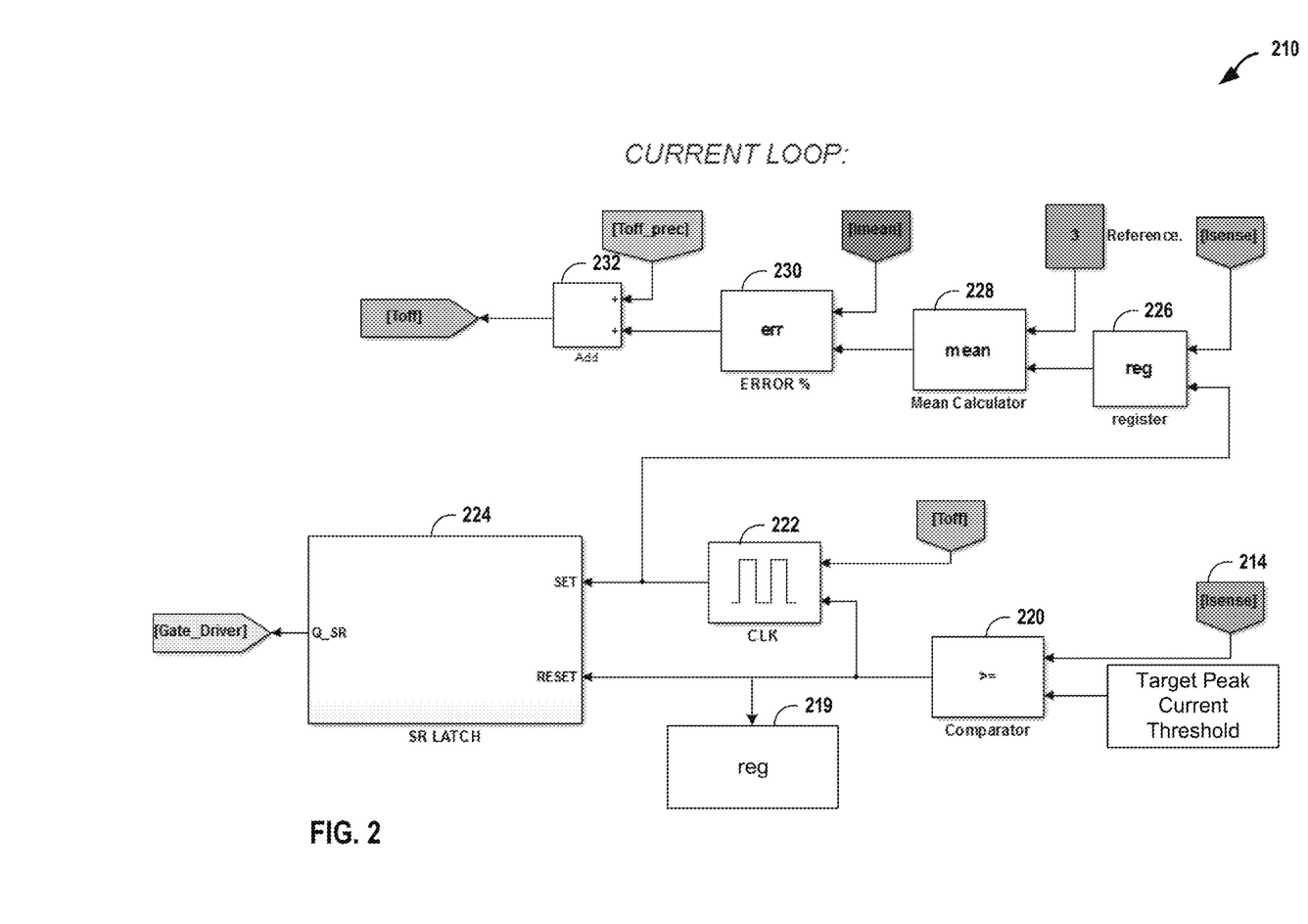
FIG. 2 is a conceptual diagram illustrating an example controller circuit that is configured to modify an off time, in accordance with one or more techniques of this disclosure.

FIG. 2 is a conceptual diagram illustrating an example controller circuit 210 that is configured to modify an off time, in accordance with one or more techniques of this disclosure. Controller circuit 210 may correspond to controller circuit 110 of system 100 shown in FIG. 1. In the example of FIG. 2, controller circuit 210 comprises current sensor 214, register 219, comparator 220, clock 222, set-reset (SR) latch 224, register 226, mean calculator 228, error module 230, adder 232. In the example of FIG. 2, controller circuit 210 modifies an off time of a set of control parameters for a buck converter. Additionally, or alternatively, a controller circuit may modify other parameters of the set of control parameters for a buck converter, for example, but not limited to, a target peak current threshold (see FIG. 5).

In the example of FIG. 2, current sensor 214 is configured to output an indication of measured current at switching element 112 of FIG. 1. Comparator 220 is configured to output a reset signal in response to the indication of measured current at switching element 112 exceeding a target peak current threshold. Clock 222 is configured to output a set signal in response to switching element 112 satisfying the off time, the clock being initialized in response to the reset signal. Clock 222 may determine that an off time during the off state for the current switching period is satisfied when a count value of clock 222 that is set to zero by the reset signal output by comparator 220 exceeds the off time.

SR latch 224 is configured to reset in response to the reset signal and set in response to the set signal. SR latch 224 may output a gate driving signal to drive switching element 112 to establish a channel when SR latch 224 is set and to drive switching element 112 to refrain from establishing a channel when SR latch 224 is reset.

Register 219 is configured to store a peak current sample in response to measured current at switching element 112 being greater than a target peak current threshold. For example, register 219 may be configured to store the peak current sample in response to the reset signal. Register 226 is configured to store the minimum current sample in response to the set signal.

Mean calculator 228 is configured to receive the peak current sample stored at register 219, receive the minimum current sample stored at register 226, and output the mean current. For example, mean calculator 228 may be configured to calculate a mean current using only the minimum current sample and the peak current sample. For example, mean calculator 228 may calculate the mean current as a sum of the minimum current sample and the peak current sample divided by two.

In some examples, controller circuit 210 may be configured to generate one or more supplemental current samples corresponding to measured current at the switching element after generating the minimum current sample and before generating the peak current sample. In this example, mean calculator 228 may be configured to calculate the mean current using the minimum current sample, the peak current sample, and the one or more supplemental current samples. In some examples, mean calculator 228 may generate a mean current sample corresponding to measured current at switching element 112 that is equidistant from generating a minimum current sample and from generating a peak current sample. For instance, mean calculator 228 may calculate the mean current as an average of the mean current sample corresponding to measured current at switching element 112 that is equidistant from generating a minimum current sample and from generating a peak current sample and a result of dividing a sum of the minimum current sample and the peak current sample by two.

Error module 230 may be configured to receive the mean from mean calculator 228, receive the target peak current threshold, and output an error signal. For example, error module 230 may calculate a difference between the mean current and a target mean current. Adder 232 may be configured to receive the error signal, receive a previous time off, and modify the time off using the error signal and the previous time off. That is, adder 232 may modify the off time using the difference between the mean current and the target mean current. For example, adder 232 may add a value corresponding (e.g., equals, is proportional, etc.) to the difference between the mean current and the target mean current to the Toff value, which will increase or decrease.

In an exemplary operation, comparator 220 compares measured current with a reference, Iref, that is the peak current value. Once the current reaches this value, comparator 220 sets a reset input of SR Latch 224 high. In response to setting the reset input, clock 222 starts to count for an amount of time equal to Toff. Clock 222 generates a gate driver signal to turn switching element 112 ON after the Toff period.

When switching element 112 is turned on, the current is minimal and register 226 stores the minimum value of the current. This storing may be performed by connecting the set signal to the enable of register 226. Similarly, when switching element 112 is turned off, the current is maximum and register 219 stores the maximum value of the current. This storing may be performed by connecting the reset signal to the enable of register 219.

Once the minimum current value is available, mean calculator 228 may calculate the average as the sum of the reference value, which is the maximum value reached by the current, and the minimum value stored, divided by two. Error module 230 may compare the calculated average with a searched value (e.g., a target mean current) in order to obtain the difference of the calculated average and the searched value. Subsequently, adder 232 adds the resulting difference to the Toff value which will increase or decrease. In particular, the Toff value may increase if the calculated average is higher than the searched value, while Toff may decrease if the calculated average is not higher than the searched value. In this example, controller circuit 210 may give the next Toff value by the control loop itself and at each subsequent cycle the average current may become closer and closer to the searched value. Accordingly, controller circuit 210 may help to control peak and the average values of the current with greater precision than systems that use a constant Toff value. In addition, controller circuit 210 may help to indirectly control a precision of the current's ripple as the current ripple may depend on how close the average is to the peak references. For instance, if the average current is very close to the peak references, a very small ripple may result.

Figure 3:
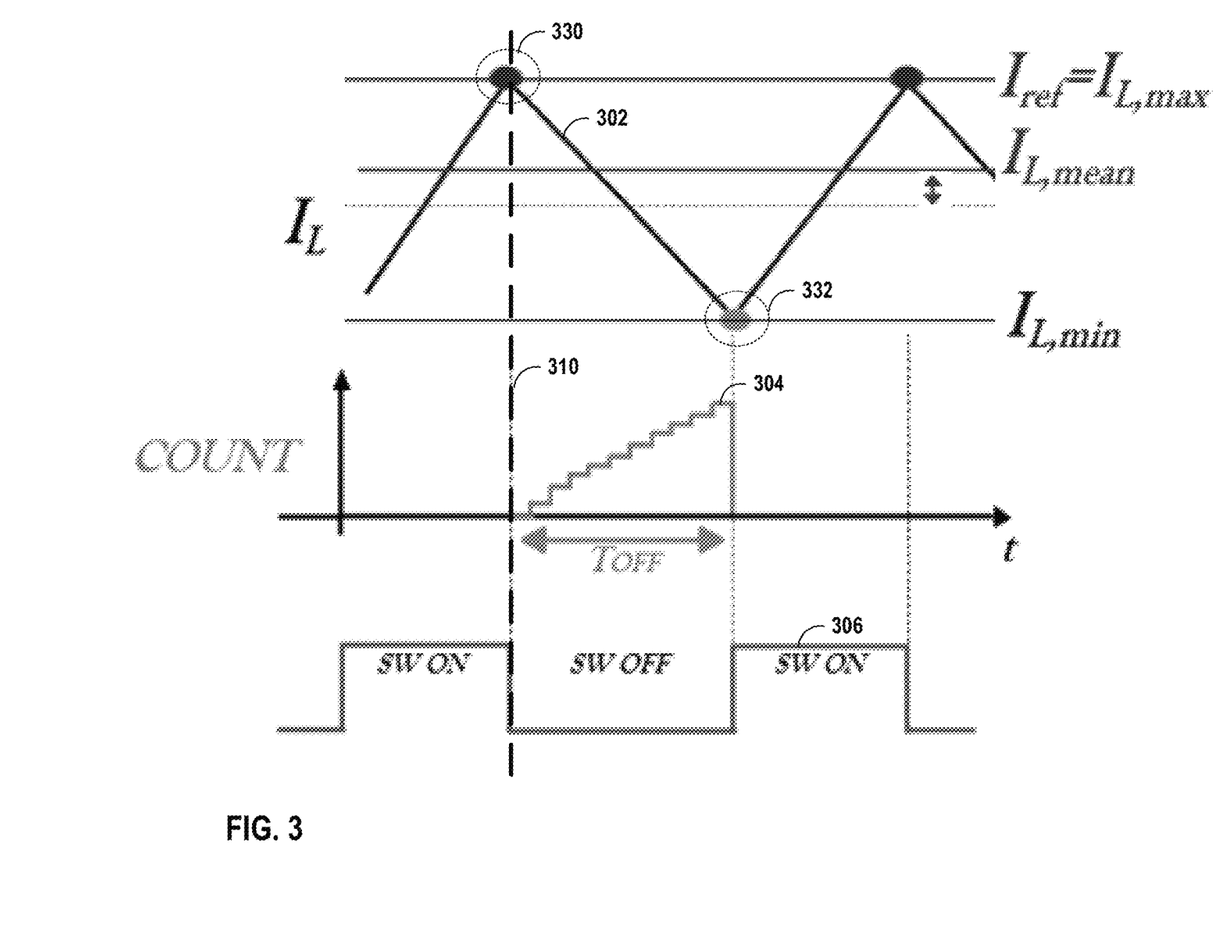
FIG. 3 is a graphical illustration of a first performance of the example controller circuit of FIG. 2, in accordance with one or more techniques of this disclosure.

FIG. 3 is a graphical illustration of a first performance of the example controller circuit 210 of FIG. 2, in accordance with one or more techniques of this disclosure. The abscissa axis (e.g., horizontal) of FIG. 3 represents time and the ordinate axis (e.g., vertical) of FIG. 3 represents inductor current 302, count value 304, and gate driver signal 306.

In the example of FIG. 3, switching element 112 is closed and controller circuit 210 monitors a rise time for inductor current 302 by, for example, reading the current. At time 310, inductor current 302 reaches a reference, for example a target peak current threshold. In this example, register 219 may store maximum value 330 in response to inductor current 302 reaching the reference. In response to inductor current 302 reaching the reference, SR latch 224 generates a gate driver signal that causes switching element 112 to switch open and inductor current 302 decreases. In the meantime, clock 222 is initialized and generates count value 304 to start counting from zero to a certain value that identifies the Toff.

Accordingly, after a duration of time equal to Toff, SR latch 224 generates a gate driver signal that causes switching element 112 to close. At this point, inductor current 302 stops descending and begins to rise. In this transient condition, inductor current 302 is at minimum value 332. In the example of FIG. 3, register 226 may store minimum value 332 after the duration of time equal to Toff. Mean calculator 228 may generate an error signal using maximum value 330 and minimum value 332, which may be used by adder 232 to modify the off time to control peak and the average values of the current with greater precision than systems that use a constant Toff value.

Figure 4:
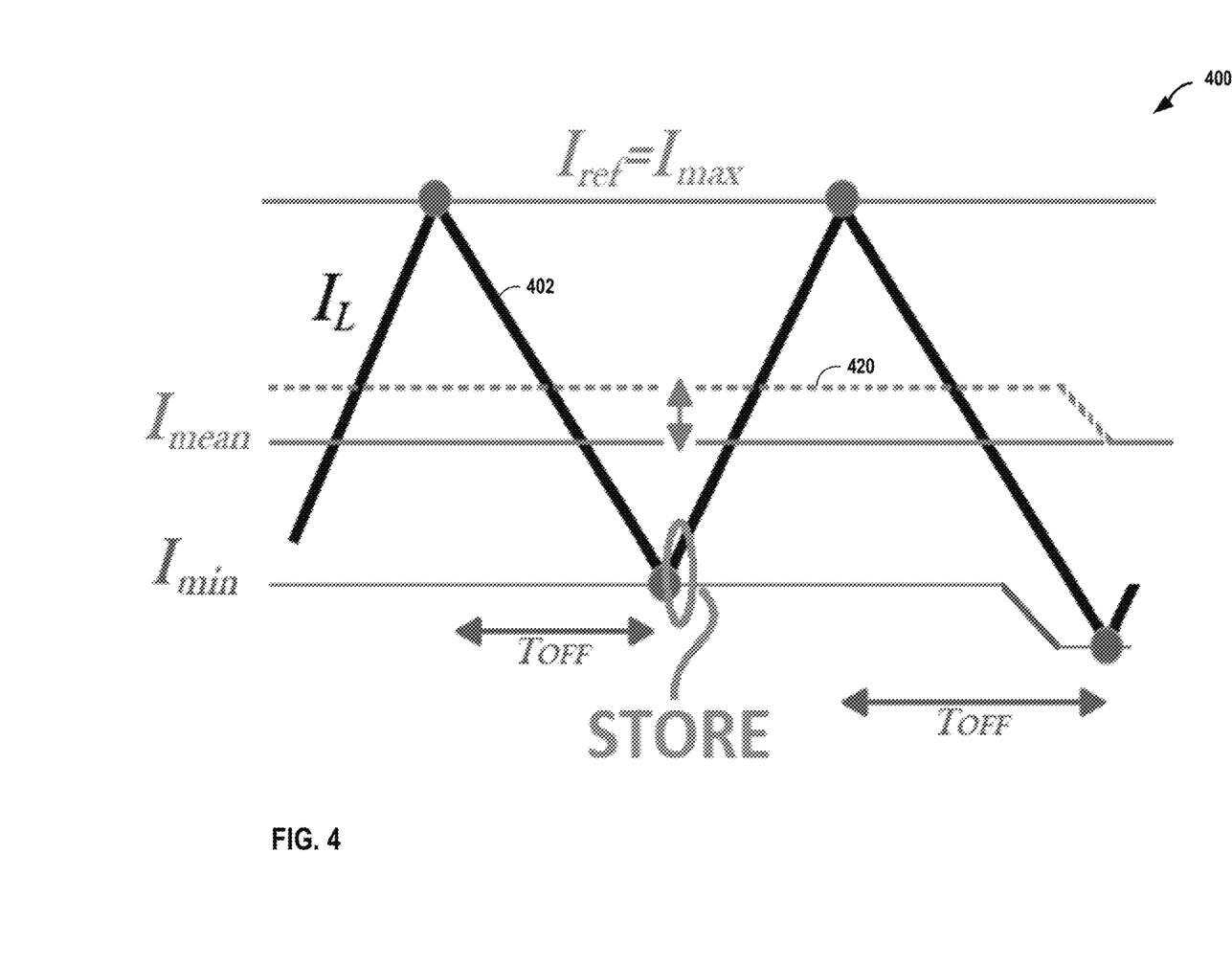
FIG. 4 is a graphical illustration of a second performance of the example controller circuit of FIG. 2, in accordance with one or more techniques of this disclosure.

FIG. 4 is a graphical illustration of a second performance of the example controller circuit 210 of FIG. 2, in accordance with one or more techniques of this disclosure. The abscissa axis (e.g., horizontal) of FIG. 4 represents time and the ordinate axis (e.g., vertical) of FIG. 4 represents inductor current 402.

In the example of FIG. 4, controller circuit 210 operates such that the Toff—the period in which the switch is OFF—is updated every switching cycle based on the average current calculated by the loop. In the example of FIG. 4, error module 230 compares calculated average 420 with the searched mean value, Imean. In this way, error module 230 can derive an error with sign that adder 232 may added to a previous value of Toff. The Toff period can increase or decrease to lengthen or shorten the ripple of inductor current 402, until the calculated average coincides with the desired value. In this way, controller circuit 210 may achieve a steady state condition.

Due to technical limitations, inductor current 402 may not be read exactly at a minimum current value. The reading circuitry (e.g., current sensor 214) may have a settling time after closing switching element 112. If this settling time is relevant in respect to Ton, controller circuit 212 may extrapolate the minimum current during post-processing. For example, to generate a minimum current sample corresponding to measured current at switching element 112, controller circuit 210 may be configured to generate the minimum current sample after driving switching element 112 to establish a channel for a first switch blanking duration. In this example, to generate the peak current sample corresponding to measured current at switching element 112, controller circuit 210 may be configured to generate the peak current sample after current at switching element 112 exceeds the target peak current threshold for a second switch blanking duration. In some examples, controller circuit 210 may use more than two measurements during the ON phase.

Controller circuit 210 may be configured to generate (e.g., store a digital value in memory, store an analog value in a capacitor, etc.) a minimum current sample corresponding to measured current at switching element 112 in response to driving switching element 112 to establish a channel. Examples of generating a minimum current sample in response to driving a switching element to establish a channel may include, but are not limited to, generating the minimum current sample (slightly) before, during, or (slightly) after driving the switching element to establish the channel.

Similarly, controller circuit 210 may be configured to generate (e.g., storing a digital value in memory, storing an analog value in a capacitor, etc.) a peak current sample corresponding to measured current at switching element 112 in response to current at switching element 112 exceeding a target peak current threshold of a set of control parameters for buck converter 104. Examples of generating a peak current sample in response to current at a switching element exceeding a target peak current threshold may include, but are not limited to, generating the peak current sample (slightly) before, during, or (slightly) after current at the switching element exceeds the target peak current threshold.

Current sensor 214 may detect the measured current at the switching element before or substantially simultaneously with generating a current sample. For example, current sensor 214 may continuously detect current at switching element 112 and the most recent detected measured current is generated as a minimum current sample only in response to driving switching element 112 to establish a channel. In another example, current sensor 214 may continuously detect current at switching element 112 and the most recent detected measured current is generated as a peak current sample only in response to current at switching element 112 exceeding a target peak current threshold.

Figure 5:
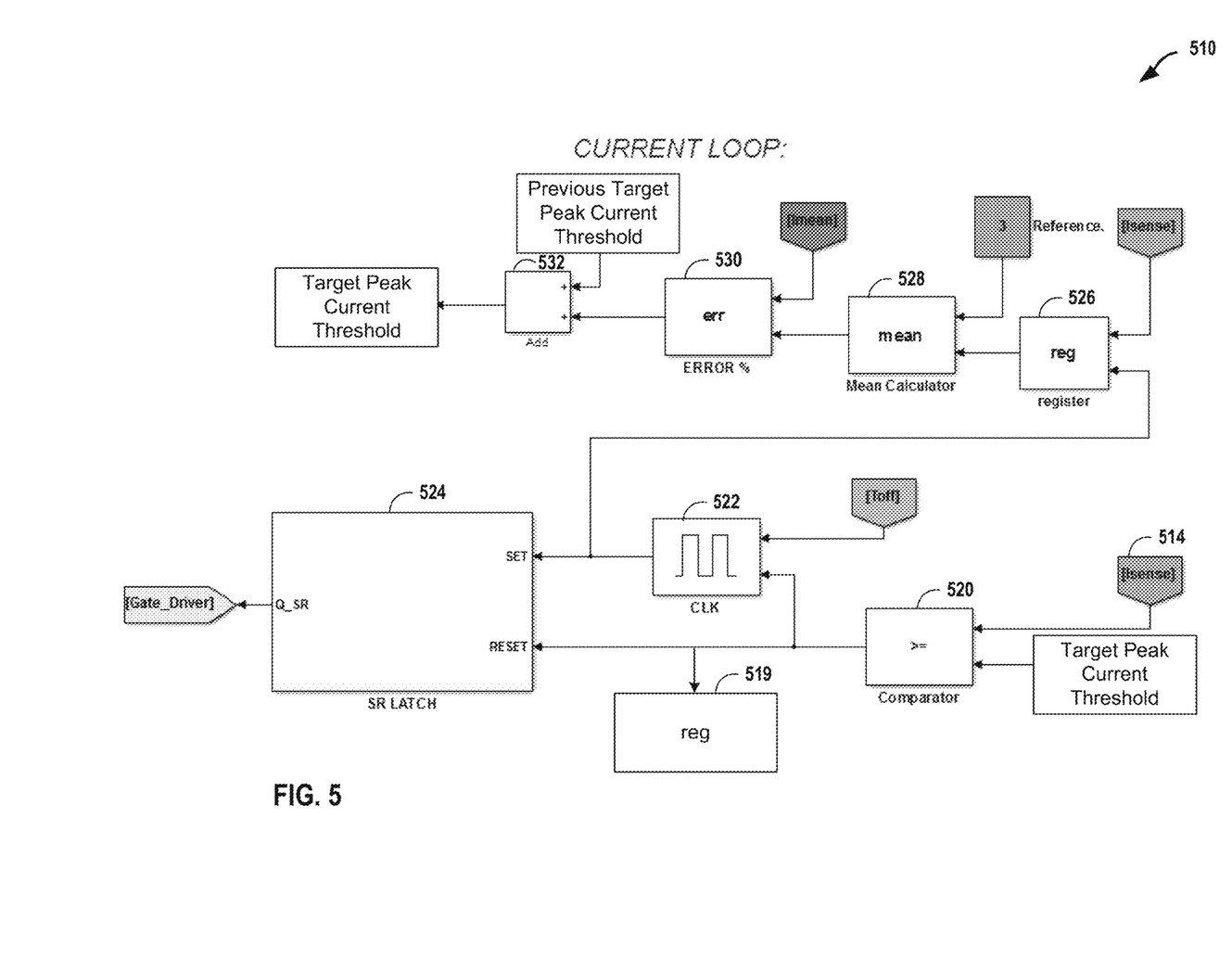
FIG. 5 is a conceptual diagram illustrating an example controller circuit that is configured to modify a target peak current threshold, in accordance with one or more techniques of this disclosure.

FIG. 5 is a conceptual diagram illustrating an example controller circuit 510 that is configured to modify a target peak current threshold, in accordance with one or more techniques of this disclosure. Controller circuit 510 may correspond to controller circuit 110 of system 100 shown in FIG. 1. In the example of FIG. 5, controller circuit 510 comprises current sensor 514, register 519, comparator 520, clock 522, SR latch 524, register 526, mean calculator 528, error module 530, adder 532.

In the example of FIG. 5, current sensor 514 is configured to output an indication of measured current at switching element 112 of FIG. 1. Comparator 520 is configured to output a reset signal in response to the indication of measured current at switching element 112 exceeding a target peak current threshold. Clock 522 is configured to output a set signal in response to switching element 112 satisfying the off time, the clock being initialized in response to the reset signal. Clock 522 may determine that an off time during the off state for the current switching period is satisfied when a count value of clock 522 that is set to zero by the reset signal output by comparator 220 exceeds the off time.

SR latch 524 is configured to reset in response to the reset signal and set in response to the set signal. SR latch 524 may output a gate driving signal to drive switching element 112 to establish a channel when SR latch 524 is set and to drive switching element 112 to refrain from establishing a channel when SR latch 524 is reset.

Register 519 is configured to store a peak current sample in response to measured current at switching element 112 being greater than a target peak current threshold. Register 526 is configured to store the minimum current sample in response to the set signal.

Mean calculator 528 is configured to receive the peak current sample stored at register 519, receive the minimum current sample stored at register 526, and output the mean current. For example, mean calculator 528 may be configured to calculate a mean current using only the minimum current sample and the peak current sample.

In some examples, controller circuit 510 may be configured to generate one or more supplemental current samples corresponding to measured current at the switching element after generating the minimum current sample and before generating the peak current sample. In this example, mean calculator 528 may be configured to calculate the mean current using the minimum current sample, the peak current sample, and the one or more supplemental current samples. In some examples, mean calculator 528 may generate a mean current sample corresponding to measured current at switching element 112 that is equidistant from generating a minimum current sample and from generating a peak current sample.

Error module 530 may be configured to receive the mean from the mean calculator, receive the target peak current threshold, and output an error signal. For example, error module 530 may calculate a difference between the mean current and a target mean current. Adder 532 may be configured to receive the error signal, receive a previous target peak current threshold, and modify the target peak current threshold using the error signal and the previous target peak current threshold. That is, adder 532 may modify the target peak current threshold using the difference between the mean current and the target mean current. For example, adder 532 may add a value corresponding (e.g., equals, is proportional, etc.) to the difference between the mean current and the target mean current to the target peak current threshold, which will increase or decrease.

Figure 6:
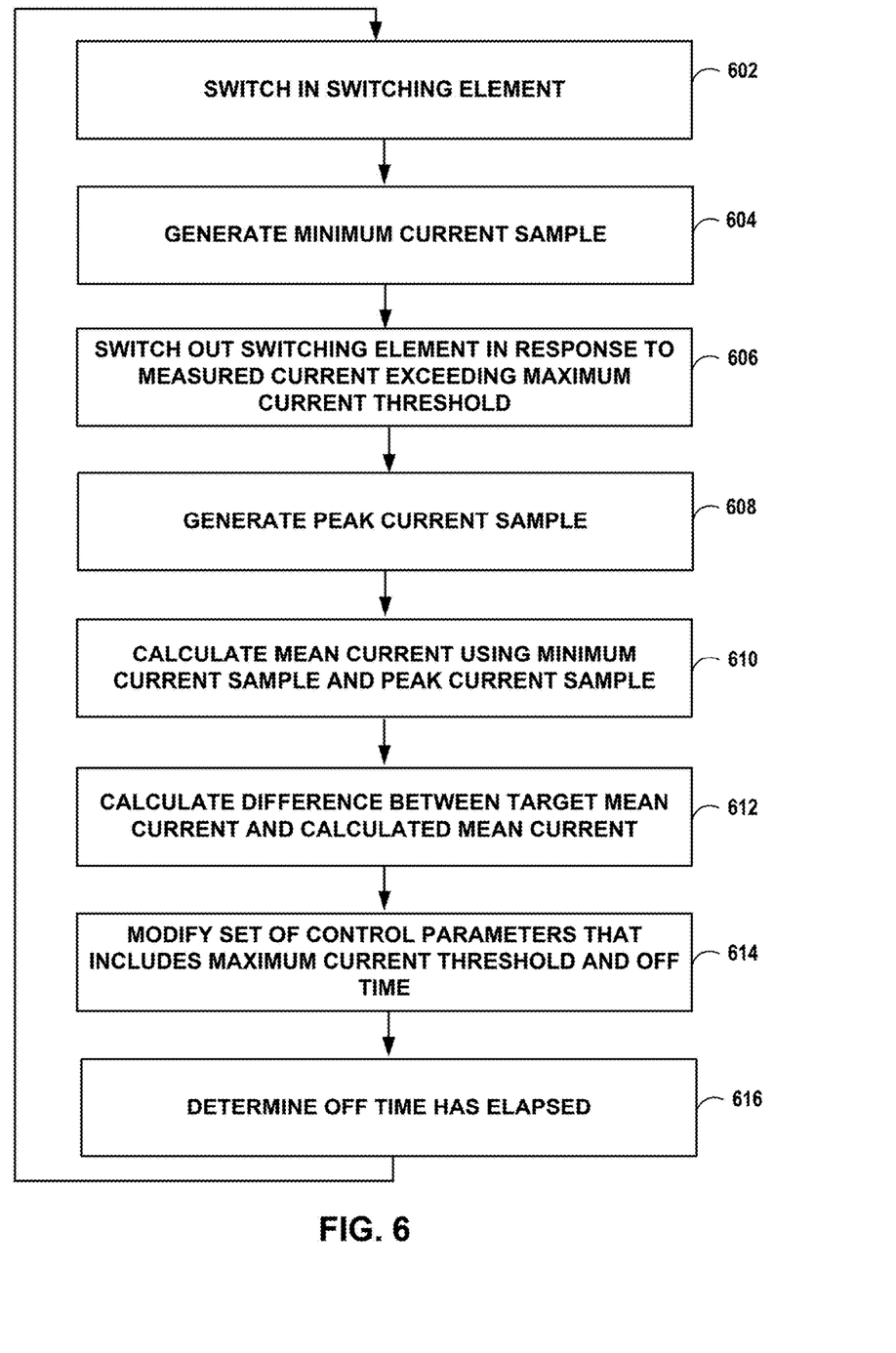
FIG. 6 is a flow diagram consistent with techniques for controlling a buck converter using a calculated average current, in accordance with this disclosure.

FIG. 6 is a flow diagram consistent with techniques for controlling a buck converter using a calculated average current, in accordance with this disclosure. For purposes of illustration only, the example operations are described below within the context of FIGS. 1-5. However, the techniques described below can be used in any permutation, and in any combination, with supply 102, buck converter 104, LEDs 106, controller circuit 110, switching element 112, and current sensor 114 of FIG. 1.

In accordance with one or more techniques of this disclosure, SR latch 224 switches in switching element 112 (602). Register 226 generates a minimum current sample (604). SR latch 224 switches out switching element 112 in response to the measured current exceeding a maximum current threshold (606). For example, comparator 220 determines the measured current exceeding a maximum current threshold and outputs a reset signal to SR latch 224.

Register 219 generates a peak current sample (608). For example, register 219 generates the peak current sample in response to the reset signal to SR latch 224. Mean calculator 228 calculates a mean current using a minimum current sample and peak current sample (610). Error module 230 calculates a difference between a target mean current and calculates mean current (612). Adder 232 modifies a set of control parameters that includes the maximum current threshold and off time (614). For example, adder 232 modifies the off time. In some examples, adder 532 modifies the maximum current threshold. Clock 222 determines off time has elapsed (616), and the process repeats to step 602 for a subsequent switching period.

The following examples may illustrate one or more aspects of the disclosure.

Example 1

A controller circuit for a buck converter configured to supply a set of light emitting diodes (LEDs), the controller circuit being configured to: drive a switching element to establish a channel that electrically couples a source to an inductive element of the buck converter during an on state for a current switching period; in response to driving the switching element to establish the channel, generate a minimum current sample corresponding to measured current at the switching element; in response to current at the switching element exceeding a target peak current threshold of a set of control parameters for the buck converter: drive the switching element to refrain from establishing the channel that electrically couples the source to the inductive element during an off state for the current switching period; generate a peak current sample corresponding to measured current at the switching element; calculate a mean current using the minimum current sample and the peak current sample; and modify the set of control parameters for the buck converter using the mean current; and in response to the switching element satisfying an off time of the set of control parameters during the off state for the current switching period, drive the switching element to establish the channel that electrically couples the source to the inductive element during an on state for a subsequent switching period.

Example 2

The controller circuit of example 1, wherein, to modify the set of control parameters, the controller circuit is configured to: calculate a difference between the mean current and a target mean current; and modify the off time using the difference between the mean current and the target mean current.

Example 3

The controller circuit of any combination of examples 1-2, wherein, to modify the set of control parameters, the controller circuit is configured to: calculate a difference between the mean current and a target mean current; and modify the target peak current threshold using the difference between the mean current and the target mean current.

Example 4

The controller circuit of any combination of examples 1-3, wherein, to calculate the mean current, the controller circuit is configured to: calculate a mean current using only the minimum current sample and the peak current sample.

Example 5

The controller circuit of any combination of examples 1-4, wherein the controller circuit is configured to: generate one or more supplemental current samples corresponding to measured current at the switching element after generating the minimum current sample and before generating the peak current sample, wherein, to calculate the mean current, the controller circuit is configured to calculate the mean current using the minimum current sample, the peak current sample, and the one or more supplemental current samples.

Example 6

The controller circuit of any combination of examples 1-5, wherein, to generate the one or more supplemental current samples, the controller circuit is configured to: generate the mean current sample corresponding to measured current at the switching element equidistant from generating the minimum current sample and from generating the peak current sample.

Example 7

The controller circuit of any combination of examples 1-6, wherein the controller circuit comprises: a current sensor configured to output an indication of measured current at the switching element; a comparator configured to output a reset signal in response to the indication of measured current at the switching element exceeding the target peak current threshold; a clock configured to output a set signal in response to the switching element satisfying the off time, the clock being initialized in response to the reset signal; and a set-reset (SR) latch configured to reset in response to the reset signal and set in response to the set signal, wherein the SR latch outputs a gate driving signal to drive the switching element to establish the channel when the SR latch is set and to drive the switching element to refrain from establishing the channel when the SR latch is reset.

Example 8

The controller circuit of any combination of examples 1-7, wherein the controller circuit comprises: a first register configured to store the peak current sample in response to measured current at the switching element being greater than the target peak current threshold; a second register configured to store the minimum current sample in response to the set signal; a mean calculator configured to receive the peak current sample stored at the first register, receive the minimum current sample stored at the second register, and output the mean current; an error module configured to receive the mean from the mean calculator, receive the target peak current threshold, and output an error signal.

Example 9

The controller circuit of any combination of examples 1-8, wherein the controller circuit comprises: an adder configured to receive the error signal, receive a previous time off, and modify the time off using the error signal and the previous time off.

Example 10

The controller circuit of any combination of examples 1-9, wherein the controller circuit comprises: an adder configured to receive the error signal, receive a previous target peak current threshold, and modify the target peak current threshold using the error signal and the previous target peak current threshold.

Example 11

The controller circuit of any combination of examples 1-10, wherein, to generate the minimum current sample corresponding to measured current at the switching element, the controller circuit is configured to generate the minimum current sample after driving the switching element to establish the channel for a first switch blanking duration; and wherein, to generate the peak current sample corresponding to measured current at the switching element, the controller circuit is configured to generate the peak current sample after current at the switching element exceeds the target peak current threshold for a second switch blanking duration.

Example 12

The controller circuit of any combination of examples 1-11, wherein the source outputs a voltage between 6 volts and 16 volts; and wherein the buck converter outputs a voltage of between 3 volts and 4 volts to the set of LEDs, wherein the set of LEDs comprises one or two LEDs.

Example 13

The controller circuit of any combination of examples 1-12, wherein the supply comprises a positive node and a reference node; wherein a current sensor arranged in an integrated circuit with the switching element is configured to output an indication of measured current at the switching element; wherein the switching element comprises a control node coupled to the controller circuit, a first node coupled to the positive node, and a second node; wherein the buck converter comprises a diode having an anode coupled to the reference node and a cathode coupled to the second node of the switching element; and wherein the inductive element comprises a first node coupled to the second node of the switching element and a second node coupled to the set of LEDs.

Example 14

A method for controlling a buck converter configured to supply a set of light emitting diodes (LEDs), the method comprising: driving, by controller circuitry, a switching element to establish a channel that electrically couples a source to an inductive element of the buck converter during an on state for a current switching period; in response to driving the switching element to establish the channel, generating, by the controller circuitry, a minimum current sample corresponding to measured current at the switching element; in response to current at the switching element exceeding a target peak current threshold of a set of control parameters for the buck converter: driving, by the controller circuitry, the switching element to refrain from establishing the channel that electrically couples the source to the inductive element during an off state for the current switching period; generating, by the controller circuitry, a peak current sample corresponding to measured current at the switching element; calculating, by the controller circuitry, a mean current using the minimum current sample and the peak current sample; and modifying, by the controller circuitry, the set of control parameters for the buck converter using the mean current; and in response to the switching element satisfying an off time of the set of control parameters during the off state for the current switching period, driving, by the controller circuitry, the switching element to establish the channel that electrically couples the source to the inductive element during an on state for a subsequent switching period.

Example 15

The method of example 14, wherein modifying the set of control parameters comprises: calculating a difference between the mean current and a target mean current; and modifying the off time using the difference between the mean current and the target mean current.

Example 16

The method of any combination of examples 14-15, wherein modifying the set of control parameters comprises: calculating a difference between the mean current and a target mean current; and modifying the target peak current threshold using the difference between the mean current and the target mean current.

Example 17

The method of any combination of examples 14-16, wherein calculating the mean current comprises: calculating a mean current using only the minimum current sample and the peak current sample.

Example 18

The method of any combination of examples 14-17, generating, by the controller circuitry, one or more supplemental current samples corresponding to measured current at the switching element after generating the minimum current sample and before generating the peak current sample, wherein calculating the mean current comprises calculating the mean current using the minimum current sample, the peak current sample, and the one or more supplemental current samples.

Example 19

The method of any combination of examples 14-18, wherein generating the one or more supplemental current samples comprises: generating the mean current sample corresponding to measured current at the switching element equidistant from generating the minimum current sample and from generating the peak current sample.

Example 20

A buck converter system comprising: a battery; a set of light emitting diodes (LEDs); a buck converter comprising an inductive element; a controller circuit configured to: drive a switching element to establish a channel that electrically couples the battery to the inductive element during an on state for a current switching period; in response to driving the switching element to establish the channel, generate a minimum current sample corresponding to measured current at the switching element; in response to current at the switching element exceeding a target peak current threshold of a set of control parameters for the buck converter: drive the switching element to refrain from establishing the channel that electrically couples the battery to the inductive element during an off state for the current switching period; generate a peak current sample corresponding to measured current at the switching element; calculate a mean current using the minimum current sample and the peak current sample; and modify the set of control parameters for the buck converter using the mean current; and in response to the switching element satisfying an off time of the set of control parameters during the off state for the current switching period, drive the switching element to establish the channel that electrically couples the battery to the inductive element during an on state for a subsequent switching period.

Various aspects have been described in this disclosure. These and other aspects are within the scope of the following claims.

The invention claimed is:

1. A controller circuit for a buck converter configured to supply a set of light emitting diodes (LEDs), the controller circuit being configured to:
drive a switching element to establish a channel that electrically couples a source to an inductive element of the buck converter during an on state for a current switching period;
in response to driving the switching element to establish the channel, generate a minimum current sample corresponding to measured current at the switching element;
in response to current at the switching element exceeding a target peak current threshold of a set of control parameters for the buck converter:
drive the switching element to refrain from establishing the channel that electrically couples the source to the inductive element during an off state for the current switching period;
generate a peak current sample corresponding to measured current at the switching element;
calculate a mean current using the minimum current sample and the peak current sample; and
modify the set of control parameters for the buck converter using the mean current; and
in response to the switching element satisfying an off time of the set of control parameters during the off state for the current switching period, drive the switching element to establish the channel that electrically couples the source to the inductive element during an on state for a subsequent switching period.

2. The controller circuit of claim 1, wherein, to modify the set of control parameters, the controller circuit is configured to:
calculate a difference between the mean current and a target mean current; and
modify the off time using the difference between the mean current and the target mean current.

3. The controller circuit of claim 1, wherein, to modify the set of control parameters, the controller circuit is configured to:
calculate a difference between the mean current and a target mean current; and
modify the target peak current threshold using the difference between the mean current and the target mean current.

4. The controller circuit of claim 1, wherein, to calculate the mean current, the controller circuit is configured to:
calculate a mean current using only the minimum current sample and the peak current sample.

5. The controller circuit of claim 1, wherein the controller circuit is configured to:
generate one or more supplemental current samples corresponding to measured current at the switching element after generating the minimum current sample and before generating the peak current sample,
wherein, to calculate the mean current, the controller circuit is configured to calculate the mean current using the minimum current sample, the peak current sample, and the one or more supplemental current samples.

6. The controller circuit of claim 5, wherein, to generate the one or more supplemental current samples, the controller circuit is configured to:
generate the mean current sample corresponding to measured current at the switching element equidistant from generating the minimum current sample and from generating the peak current sample.

7. The controller circuit of claim 1, wherein the controller circuit comprises:
a current sensor configured to output an indication of measured current at the switching element;
a comparator configured to output a reset signal in response to the indication of measured current at the switching element exceeding the target peak current threshold;
a clock configured to output a set signal in response to the switching element satisfying the off time, the clock being initialized in response to the reset signal; and
a set-reset (SR) latch configured to reset in response to the reset signal and set in response to the set signal, wherein the SR latch outputs a gate driving signal to drive the switching element to establish the channel when the SR latch is set and to drive the switching element to refrain from establishing the channel when the SR latch is reset.

8. The controller circuit of claim 7, wherein the controller circuit comprises:
a first register configured to store the peak current sample in response to measured current at the switching element being greater than the target peak current threshold;
a second register configured to store the minimum current sample in response to the set signal;
a mean calculator configured to receive the peak current sample stored at the first register, receive the minimum current sample stored at the second register, and output the mean current;
an error module configured to receive the mean from the mean calculator, receive the target peak current threshold, and output an error signal.

9. The controller circuit of claim 8, wherein the controller circuit comprises:
an adder configured to receive the error signal, receive a previous time off, and modify the time off using the error signal and the previous time off.

10. The controller circuit of claim 8, wherein the controller circuit comprises:
an adder configured to receive the error signal, receive a previous target peak current threshold, and modify the target peak current threshold using the error signal and the previous target peak current threshold.

11. The controller circuit of claim 1,
wherein, to generate the minimum current sample corresponding to measured current at the switching element, the controller circuit is configured to generate the minimum current sample after driving the switching element to establish the channel for a first switch blanking duration; and
wherein, to generate the peak current sample corresponding to measured current at the switching element, the controller circuit is configured to generate the peak current sample after current at the switching element exceeds the target peak current threshold for a second switch blanking duration.

12. The controller circuit of claim 1,
wherein the source outputs a voltage between 6 volts and 16 volts; and wherein the buck converter outputs a voltage of between 3 volts and 4 volts to the set of LEDs, wherein the set of LEDs comprises one or two LEDs.

13. The controller circuit of claim 1,
wherein the supply comprises a positive node and a reference node;
wherein a current sensor arranged in an integrated circuit with the switching element is configured to output an indication of measured current at the switching element;
wherein the switching element comprises a control node coupled to the controller circuit, a first node coupled to the positive node, and a second node;
wherein the buck converter comprises a diode having an anode coupled to the reference node and a cathode coupled to the second node of the switching element; and
wherein the inductive element comprises a first node coupled to the second node of the switching element and a second node coupled to the set of LEDs.

14. A method for controlling a buck converter configured to supply a set of light emitting diodes (LEDs), the method comprising:
driving, by controller circuitry, a switching element to establish a channel that electrically couples a source to an inductive element of the buck converter during an on state for a current switching period;
in response to driving the switching element to establish the channel, generating, by the controller circuitry, a minimum current sample corresponding to measured current at the switching element;
in response to current at the switching element exceeding a target peak current threshold of a set of control parameters for the buck converter:
driving, by the controller circuitry, the switching element to refrain from establishing the channel that electrically couples the source to the inductive element during an off state for the current switching period;
generating, by the controller circuitry, a peak current sample corresponding to measured current at the switching element;
calculating, by the controller circuitry, a mean current using the minimum current sample and the peak current sample; and
modifying, by the controller circuitry, the set of control parameters for the buck converter using the mean current; and
in response to the switching element satisfying an off time of the set of control parameters during the off state for the current switching period, driving, by the controller circuitry, the switching element to establish the channel that electrically couples the source to the inductive element during an on state for a subsequent switching period.

15. The method of claim 14, wherein modifying the set of control parameters comprises:
calculating a difference between the mean current and a target mean current; and
modifying the off time using the difference between the mean current and the target mean current.

16. The method of claim 14, wherein modifying the set of control parameters comprises:
calculating a difference between the mean current and a target mean current; and
modifying the target peak current threshold using the difference between the mean current and the target mean current.

17. The method of claim 14, wherein calculating the mean current comprises:
calculating a mean current using only the minimum current sample and the peak current sample.

18. The method of claim 14, further comprising:
generating, by the controller circuitry, one or more supplemental current samples corresponding to measured current at the switching element after generating the minimum current sample and before generating the peak current sample,
wherein calculating the mean current comprises calculating the mean current using the minimum current sample, the peak current sample, and the one or more supplemental current samples.

19. The method of claim 18, wherein generating the one or more supplemental current samples comprises:
generating the mean current sample corresponding to measured current at the switching element equidistant from generating the minimum current sample and from generating the peak current sample.

20. A buck converter system comprising:
a battery;
a set of light emitting diodes (LEDs);
a buck converter comprising an inductive element;
a controller circuit configured to:
drive a switching element to establish a channel that electrically couples the battery to the inductive element during an on state for a current switching period;
in response to driving the switching element to establish the channel, generate a minimum current sample corresponding to measured current at the switching element;
in response to current at the switching element exceeding a target peak current threshold of a set of control parameters for the buck converter:
drive the switching element to refrain from establishing the channel that electrically couples the battery to the inductive element during an off state for the current switching period;
generate a peak current sample corresponding to measured current at the switching element;
calculate a mean current using the minimum current sample and the peak current sample; and
modify the set of control parameters for the buck converter using the mean current; and
in response to the switching element satisfying an off time of the set of control parameters during the off state for the current switching period, drive the switching element to establish the channel that electrically couples the battery to the inductive element during an on state for a subsequent switching period.

* * * * *